United States Patent [19]
Carlsen

[11] 4,140,460
[45] Feb. 20, 1979

[54] CONTROL OF BLOWN FILM TUBE DIAMETER

[75] Inventor: Richard A. Carlsen, Somerset, N.J.

[73] Assignee: Egan Machinery Company, Somerville, N.J.

[21] Appl. No.: 829,722

[22] Filed: Sep. 1, 1977

[51] Int. Cl.² ............................................. B29D 23/04
[52] U.S. Cl. ..................................... 425/140; 264/40.3; 264/210 R; 425/72 R; 425/149; 425/326.1; 425/387.1; 425/392; 425/467
[58] Field of Search ................... 137/596.12, 223, 224; 264/40.3, 210 R, 209; 425/72 R, 326.1, 140, 387.1, 141, 392, 393, 380, 467, 155, 149

[56] References Cited
U.S. PATENT DOCUMENTS 3,932,080  1/1976  Uemura et al. ................. 425/140 X
4,069,292  1/1978  Herrington et al. ......... 425/326.1 X

*Primary Examiner*—Roy Lake
*Assistant Examiner*—Mark Rosenbaum
*Attorney, Agent, or Firm*—David A. Yerwer

[57] ABSTRACT

Control apparatus for automatically maintaining the desired blown tube diameter in the blown plastic film process where the blown tube is internally cooled by a gas flow into and out of the interior of the tube. A by-pass duct having a by-pass damper is provided on either the inlet or exhaust duct by-passing the inlet or exhaust duct damper respectively and this by-pass damper is controlled by tube diameter sensors. By thus controlling only a small percentage of the inlet or exhaust flow a very fine and stable control is achieved. Control apparatus is also provided to maintain the by-pass damper in its optimum operating range.

12 Claims, 2 Drawing Figures

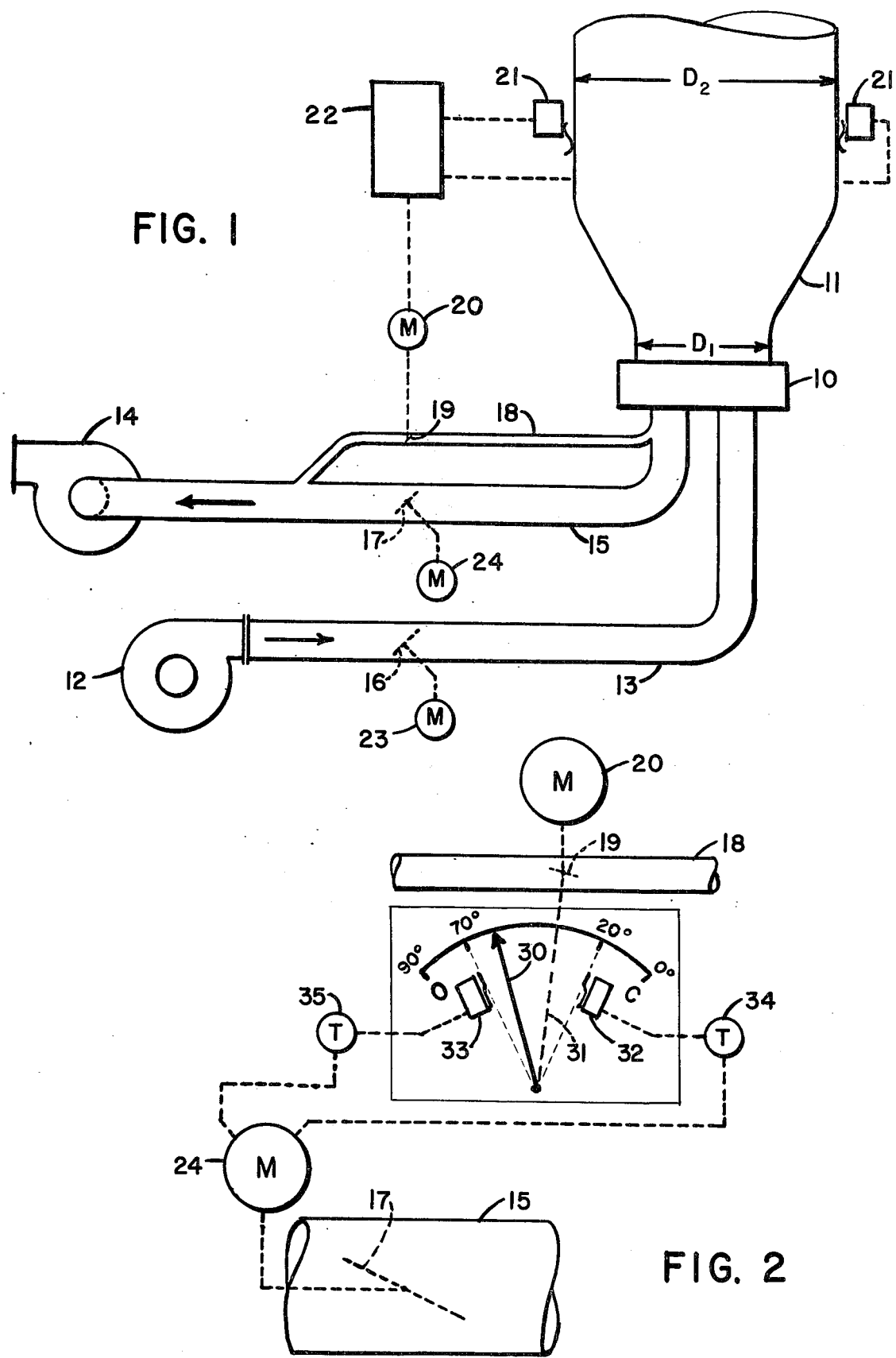

CONTROL OF BLOWN FILM TUBE DIAMETER

BACKGROUND OF THE INVENTION

1. Field of the Invention

This invention relates to apparatus for manufacturing blown tubular plastic film and in particular in apparatus for controlling the diameter, and therefore in the layflat width, of the blown tube by controlling the volume of cooling gas admitted to and exhausted from the blown tube.

2. Description of the Prior Art

The manufacturing of plastic film by the blown film process is well known in the art and reference may be had to U.S. Pat. No. 2,461,975 for a disclosure of the basic process. In this process as shown by the patent the diameter of the blown tube is controlled by pressure and volume of the trapped gas (usually air) which is introduced into the interior of the tube. This patent also discloses the use of a coolant gas impinging on the exterior of the tube to cool the plastic material after it leaves the die. In order to obtain high production rates it has been found desirable to provide additional cooling means which act on the interior of the tube, usually in conjunction with the aforementioned exterior means, as disclosed in French Pat. No. 1,190,773 and West German Pat. No. 1,106,951. The use of internal cooling according to these means requires that the cooling gas be continuously introduced and continuously withdrawn from the blown tube, in contrast to the trapped air as disclosed in U.S. Pat. No. 2,461,975. In order to control the diameter of the blown tube (and the consequent width of the layflat film) it is necessary to very precisely control the gas flow into and out of the tube. It is also desirable that these flows be controlled automatically, such as by means which continuously monitor the blown tube diameter and provide signals to flow control means to maintain the tube diameter within commericially acceptable limits.

Apparatus is known to monitor or sense the bubble diameter in the blown film process by means of electrical, mechanical or pneumatic devices. For example see British Pat. No. 1,017,398 and U.S. Pat. Nos. 3,125,616, 3,700,370 and 3,990,824. It is also known to provide damper means in the inlet and outlet gas ducts to control the gas flows, as disclosed in U.S. Pat. Nos. 3,762,853 and 3,898,028 among others.

In most cases, for example as when low density polyethylene is processed, the gas pressure in the blown tube is very low, only slightly above the atmospheric pressure on the exterior of the tube, while the gas flow is comparatively high to obtain adequate cooling. Control of the flow by a damper or dampers therefore must be very sensitive to variations in tube diameter and must adjust the comparatively high flow in very small increments.

Applicant has found that the relatively coarse control provided by the conventional damper in the gas flow duct or ducts makes it very difficult to obtain satisfactory control of the flow and has therefore conceived a novel flow control means that provides excellent control of the flow and yet is economical to manufacture and use.

SUMMARY OF THE INVENTION

The present invention provides a by-pass duct, having a by-pass damper, on either the gas inlet duct or the gas outlet duct, the by-pass duct by-passing the flow around the inlet or outlet duct damper respectively. The by-pass damper is automatically actuated by blown tube diameter sensor means and by therefore controlling only a small fraction of the inlet or exhaust flow achieves a fine and stable gas flow to maintain the desired tube diameter.

Apparatus is also provided to maintain the by-pass damper in its optimum operating range by making small adjustments of the inlet or outlet duct damper whenever the by-pass damper approaches the limits of this operating range.

An object of the present invention is to provide apparatus for controlling the diameter of a blown tube of plastics material wherein the interior of the tube is cooled by a continuous flow of a gas.

A further object is to provide the above control means which are respondent to tube diameter sensor means and which control the gas flow in ducts leading into and out of the blown tube.

A further object is to provide the above control means which can precisely control the gas flow and which are simple and economical to manufacture and use.

BRIEF DESCRIPTION OF THE DRAWINGS

FIG. 1 is a partially schematic view of the invention.

FIG. 2 is a partially schematic view of an imlprovement to the invention.

DESCRIPTION OF THE PREFERRED EMBODIMENT

FIG. 1 is a partially schematic representation of a preferred embodiment of the invention wherein 10 represents a conventional blown film die from which a tube 11 of plastic material having a diameter $D_1$ is extruded, and is drawn vertically upwards by pull rolls (not shown) causing the wall thickness of the tube to be reduced. Due to the gas pressure in the interior of the tube, the tube expands in diameter, or "blows", to a larger diameter $D_2$ at which time the material has cooled sufficiently to prevent further expansion.

Cooling gas is continuously supplied by supply blower 12 to the interior of the tube 11 by means of supply duct 13 and is continuously removed from the interior of the tube by exhaust blower 14 by means of exhaust duct 15. Installed in supply duct 13 is manually operated damper 16, and installed in exhaust duct 15 is manually operated damper 17. Although the manually operated dampers 16 and 17 may be directed hand adjusted by mechanical means, for convenience and ease of control they may be actuated by positioning motors 23 and 24 respectively which are responsive to a mechanical, pneumatic, electrical or other type of signal. One suitable positioning motor is a Honeywell Modutrol Motor Model No. M944 which is responsive to an electrical signal, such as from hand operated push-buttons, and available from Honeywell Inc. On the exhaust duct 15 a by-pass duct 18 is provided, allowing a portion of the exhaust gas flow to by-pass the damper 17. This by-pass duct is of considerably smaller cross sectional area than the exhaust duct, the cross sectional area of the by-pass duct being preferably in the range of 1.5% to 6.5% of the cross-sectional area of the exhaust duct, so that the portion of gas which flows through the by-pass duct is only a small fraction of the total flow exhausted from the blown tube. The by-pass duct is connected to the exhaust duct at locations which are separated by a distance sufficient to obtain an appreciable gas pressure drop in the exhaust duct between the locations, thus insuring sufficient gas flow through the by-pass. The distance between the connection locations depends on the size of the exhaust duct, the volume of flow through the duct and other factors as is known in the art. Installed in the by-pass duct 18 is a damper 19 which is actuated by a by-pass positioning motor 20 of the same type or similar to that aforementioned.

One or more tube diameter sensors 21 are provided to detect any variations in the blown tube diameter. The signals from the sensors are sent to a controller 22 where they are converted to a signal to operate the damper positioning motor 20. One suitable type of sensor is Model 111 Linear Displacement Potentiometer by Vernitec Division of Vernatron Corp. It is preferred to provide at least two sensors at 180 degrees so that variations in tube diameter can be distinguished from displacement from side to side of the tube as a whole. This may be accomplished by means similar to those disclosed in U.S. Pat. No. 3,100,889 or 3,233,328.

At startup of the process, the dampers 16 and 17 are manually adjusted until the desired tube diameter $D_2$ is obtained. The dampers 16 and 17 are left in their respective position and further adjustment of the flow is made automatically by movement of the by-pass damper 19 through actuation by the positioning motor 20 responsive to the signals from the sensors 21. Since the gas flow through the by-pass 18 is only a small part of the total exhaust flow, considerable change in position of the by-pass damper results in a very small change in the total exhaust flow and thus a very fine and stable control is obtained compared to that of known devices, such as those that attempt to control flow by means of dampers installed in the exhaust or inlet ducts themselves.

Due to variations in ambient conditions and other variations during the operation, the exhaust flow will be changed as these variations occur to maintain the desired blown tube diameter. It is possible for conditions to vary to the extent that the by-pass damper 19 will be driven to either end of its range and control would therefore be lost. It is also desirable that this damper not be operated in proximity to either end of its range as the gas flow control of a damper is poor within the last several degrees of the open or closed position. In the usual gas duct damper of the rotary type having a total rotational movement of about 90°, the most satisfactory control of gas flow is usually obtained in the range of damper opening of about 15° – 20° open to 70° – 80° open.

In order to maintain the operation of the by-pass damper within a satisfactory operating range, means as shown schematically in FIG. 2 may be provided. Position pointer 30 is actuated by a mechanical connection 31 to by-pass damper 19 in by-pass duct 18 and indicates the degree of opening of the damper. The connection 31 may for convenience, be made instead to the by-pass positioning motor 20. Limit switch 32 is provided so that it is energized by the pointer 30 when the damper approaches about 20° from the full closed position and limit switch 33 is provided so that it is energized by the pointer when the damper approaches about 70° open position. Limit switch 32 is electrically connected to a continuous timer 34 which in turn is electrically connected to the positioning motor 24 which actuates the exhaust damper 17 in exhaust duct 15. In a similar manner limit switch 33 is electrically connected to continuous timer 35 in turn electrically connected to positioning motor 24. The continuous timers are known devices which, when energized, generate short duration electrical pulses at regular intervals. Satisfactory operation has been obtained with such timers where pulses of 0.1 to 0.5 seconds duration are generated at intervals of about 15 seconds, although the pulse duration and interval may vary over a wide range according to the physical and operating characteristics of the particular equipment. The pulses are transmitted to the positioning motor 24 and cause it to rotate the damper 17 in very small increments in a closing or opening direction according to the signal from limit switch 33 or 32 respectively.

For the purposes of understanding the operation, it will be assumed that operating conditions have required that more exhaust flow is required from time to time to maintain a constant blown tube diameter. The by-pass damper 19 will therefore continue to open to increase the gas exhaust gas flow until it and the positioning pointer 30 reaches about 70° damper opening. At this position the limit switch 33 is energized, thus energizing the continuous timer 35 and short duration electrical pulses will be transmitted to the positioning motor 24 to rotate it in the opening direction in very small increments. As the flow is then gradually increased in the exhaust duct 15, the by-pass damper will automatically begin to close to maintain proper total exhaust flow to maintain constant blown tube diameter. When the pointer 30 has disengaged from the limit switch 33, timer 35 will be de-energized and the incremental movement of damper 17 will cease. At this time the flow will again be under sole control of the by-pass damper. If the operating conditions require less exhaust flow, limit switch 32 will be energized and the damper 17 moved incrementally toward the closed position until by-pass damper 19 again takes over control in a similar manner. It is therefore evident that the by-pass damper will always operate in a satisfactory control range such as from about 20° to 70° open.

Although applicant has found that best control is obtained by installation of the by-pass and by-pass damper in the exhaust gas flow line and this location is preferred, the by-pass and damper may instead be installed in the inlet line with satisfactory results.

In some blown film processes wherein plastic materials of higher strengths are extruded, the gas pressure within the tube may be much higher than those used for low density polyethylene and in these cases it may be possible to dispense with the need for an exhaust blower.

The word "damper" as used herein refers to any type of device which acts to control the flow of gas in a duct.

I claim:

1. Apparatus for automatically controlling the diameter of an extruded tube of plastic material in the blown film process comprising:
    a blown film extrusion die;
    an inlet gas blower;
    an inlet duct connected to the inlet blower and to the extrusion die to introduce cooling gas into the extruded tube;
    an inlet damper in the inlet duct;
    an exhaust duct connected to the extrusion die to remove the cooling gas from the extruded tube;
    an exhaust damper in the exhaust duct;
    sensor means to detect variations in the diameter of the extruded tube;
    positioning means responsive to the sensor means;

a by-pass duct connected to the exhaust duct so as to by-pass a portion of the cooling gas around the exhaust damper, the by-pass duct having a smaller cross-sectional area than the exhaust duct; and a by-pass damper in the by-pass duct and actuated by the positioning means to control the gas flow through the by-pass duct to control the diameter of the extruded tube.

2. The apparatus of claim 1 wherein the by-pass duct is connected to the inlet duct so as to by-pass a portion of the cooling gas around the inlet damper.

3. The apparatus of claim 2 wherein an exhaust blower is connected to the exhaust duct to remove the cooling gas from the extruded tube.

4. The apparatus of claim 2 wherein the cross-sectional area of the by-pass duct is in the range of 1.5% to 6.5% of the cross sectional area of the inlet duct.

5. The apparatus of claim 2 wherein control means are provided to maintain the by-pass damper in an optimum operating range lying between damper positions removed from the open and closed positions.

6. The apparatus of claim 5 wherein the control means comprises:

limit means to detect the by-pass damper position at positions removed from the open and closed positions; and inlet damper positioning means to actuate the inlet damper in response to signals from the limit means to increase or decrease the gas flow through the inlet duct.

7. The apparatus of claim 5 wherein the control means comprises:

limit means to detect the by-pass damper position at positions removed from the open and closed positions;

timer means responsive to signals from the limit means to provide a pulse signal; and inlet damper positioning means to incrementally actuate the inlet damper in response to the pulse signals to incrementally increase or decrease the gas flow through the inlet duct.

8. The apparatus of claim 1 wherein an exhaust blower is connected to the exhaust duct to remove the cooling gas from the extruded tube.

9. The apparatus of claim 1 wherein the cross-sectional area of the by-pass duct is in the range of 1.5% to 6.5% of the cross-sectional area of the exhaust duct.

10. The apparatus of claim 1 wherein control means are provided to maintain the by-pass damper in an optimum operating range lying between damper positions removed from the open and closed positions.

11. The apparatus of claim 10 wherein the control means comprises:

limit means to detect the by-pass damper position at positions removed from the open and closed positions; and exhaust damper positioning means to actuate the exhaust damper in response to signals from the limit means to increase or decrease the gas flow through the exhaust duct.

12. The apparatus of claim 10 wherein the control means comprises:

limit means to detect the by-pass damper position at positions removed from the open and closed positions;

timer means responsive to signals from the limit means to provide a pulse signal; and exhaust damper positioning means to incrementally actuate the exhaust damper in response to the pulse signals to incrementally increase or decrease the gas flow through the exhaust duct.

* * * * *